(12) United States Patent
Takahashi

(10) Patent No.: US 7,287,104 B2
(45) Date of Patent: Oct. 23, 2007

(54) INTERFACE CIRCUIT FOR CARD-TYPE MEMORY, ASIC INCLUDING INTERFACE CIRCUIT, AND IMAGE FORMING APPARATUS INCLUDING ASIC

(75) Inventor: Toshio Takahashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 74 days.

(21) Appl. No.: 10/743,828

(22) Filed: Dec. 24, 2003

(65) Prior Publication Data
US 2004/0186955 A1 Sep. 23, 2004

(30) Foreign Application Priority Data
Dec. 27, 2002 (JP) ............................. 2002-382155
Dec. 12, 2003 (JP) ............................. 2003-414817

(51) Int. Cl.
*G06F 13/00* (2006.01)
*G06F 13/42* (2006.01)

(52) U.S. Cl. ............................ 710/52; 710/33; 710/72; 711/115; 711/156; 711/170

(58) Field of Classification Search ................. 710/52, 710/72, 33; 711/115, 170, 156
See application file for complete search history.

(56) References Cited

U.S. PATENT DOCUMENTS

| | | | | |
|---|---|---|---|---|
| 5,541,985 A | * | 7/1996 | Ishii et al. ................... 379/111 |
| 6,085,282 A | * | 7/2000 | Hansen et al. ............... 711/103 |
| 6,216,015 B1 | * | 4/2001 | Hymel ........................ 455/558 |
| 6,463,300 B1 | * | 10/2002 | Oshima ....................... 455/558 |
| 6,633,928 B2 | * | 10/2003 | Aulino et al. .................. 710/52 |
| 6,742,715 B2 | * | 6/2004 | Everett et al. ............... 235/492 |
| 6,886,083 B2 | * | 4/2005 | Murakami ................... 711/156 |
| 2003/0172209 A1 | * | 9/2003 | Liu et al. ....................... 710/62 |

FOREIGN PATENT DOCUMENTS

| EP | 790560 | * | 8/1997 |
|---|---|---|---|
| JP | 11-242596 | | 9/1999 |

* cited by examiner

*Primary Examiner*—Tammara Peyton
(74) *Attorney, Agent, or Firm*—Oblon, Spivak, McClelland, Maier & Neustadt, P.C.

(57) ABSTRACT

An interface circuit reads data for a few sectors from a card-type memory and stores the data in a buffer. When a receiving unit receives a read-access from an image forming apparatus, a data checker decides whether data corresponding to the read-access exists in the buffer, and a transmitter sends the data corresponding to the read-access from the buffer to the image forming apparatus. If data corresponding to the read-access does not exist in the buffer, some of the data is deleted from the buffer, data corresponding to the read-access is read from the card-type memory, stored in the buffer, and sent to the image forming apparatus.

14 Claims, 5 Drawing Sheets

INTERFACE CIRCUIT FOR CARD-TYPE MEMORY, ASIC INCLUDING INTERFACE CIRCUIT, AND IMAGE FORMING APPARATUS INCLUDING ASIC

CROSS-REFERENCE TO RELATED APPLICATIONS

The present document incorporates by reference the entire contents of Japanese priority documents, 2002-382155 filed in Japan on Dec. 27, 2002 and 2003-414817 filed in Japan on Dec. 12, 2003.

BACKGROUND OF THE INVENTION

1) Field of the Invention

The present invention relates to an interface circuit for a card-type memory such as a secure digital (SD) card that is detachable and requires access by sectors, and to an application specific integrated circuit (ASIC) including the interface circuit, and an image forming apparatus including the ASIC.

2) Description of the Related Art

One approach to update software for equipment such as printers, copying machines, and multifunction peripherals (MFP) is to load the software from a memory card or download the software through a host interface of a network. However, in many cases, e.g., in field support, the host interface can not be used.

To allow the use of the host interface, some equipment is provided with a memory card interface. The memory card is handled in the same manner as random access memory (RAM). In other words, when the memory card is used, the interface does not require initialization. In addition, a program can be executed on the memory card. However, the memory cards have a problem in that they have low capacity of at most 4 megabytes, and they are not readily available in the market these days.

Japanese Patent Application Laid Open No. H11-242596 (see FIG. 1) discloses SD cards that can be used instead of the memory cards. The SD cards are attracting attention as portable media like floppy disks (FD). The SD card has a larger capacity per unit size, so that it is useful for recording and reproducing image data or audio data. If the access to the SD card is restricted to a read-access, a basic input/output system (BIOS) is not required. In addition, only required data can be read out according to the access from a central processing unit (CPU), and therefore, a program can be executed on the SD card without data being copied to a random access memory (RAM). If a communication error occurs, a communication speed is automatically reduced step by step to a speed at which no error occurs, then the processing is continued. Thus, it is possible to perform data communications without changing software and hardware.

However, in an SD card interface with a buffer size only by one sector, if a program extends over a plurality of sectors due to a jump instruction or the like, an overhead required for reading data from the card-type memory is largely affected, which causes an execution speed of the program to below.

SUMMARY OF THE INVENTION

It is an object of the present invention to solve at least the problems in the conventional technology.

An interface circuit capable of allowing transmission of data from a detachable card-type memory, which requires access by sectors, to an electronic device, according to one aspect of the present invention includes a reading unit that reads data for a plurality of sectors from the card-type memory; a buffer that stores the data read and has a capacity to store data for a plurality of sectors; a receiver that receives from the electronic device a read-access for data stored in the buffer; a data checker that decides whether data corresponding to the read-access exists among the data stored in the buffer; and a transmitter that transmits the data from the buffer to the electronic device when the data checker decides that data corresponding to the read-access exists among the data stored in the buffer.

An application specific integrated circuit and an image forming apparatus according to other aspects of the present invention employ the interface circuit according to the present invention.

The other objects, features, and advantages of the present invention are specifically set forth in or will become apparent from the following detailed descriptions of the invention when read in conjunction with the accompanying drawings.

DETAILED DESCRIPTION

Exemplary embodiments of an interface circuit for a card-type memory, an application specific integrated circuit, and an image forming apparatus according to the present invention are explained in detail below with reference to the accompanying drawings.

Figure 1:
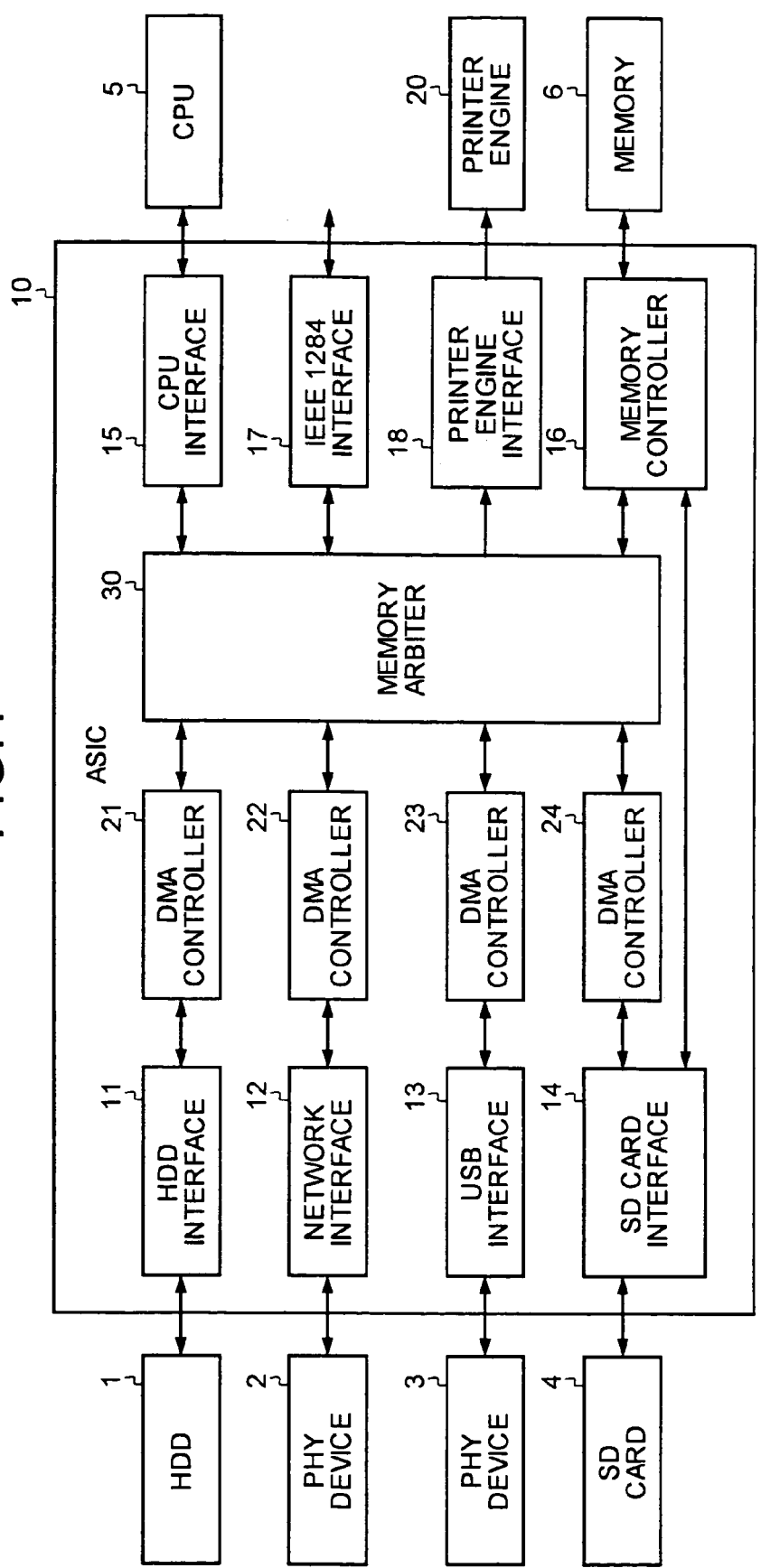
FIG. 1 is a block diagram of an image forming apparatus according to an embodiment of the present invention.

FIG. 1 is a block diagram of an image forming apparatus according to an embodiment of the present invention. This image forming apparatus includes an ASIC 10 that includes a plurality of application functions such as an image input/output function, an image processing function, and data communications. The application functions are designed to share a memory 6 and a hard disk in a hard disk drive (HDD) 1 as common resources. The ASIC 10 is connected with the HDD 1, a physical layer (PHY) device (which is, for example, a network device) 2, a PHY device (which is, for example, a USB device) 3, and an SD card 4 (hereinafter, "card 4"). The ASIC 10 is also connected with a CPU 5, the memory 6, a printer engine 20, and an Institute of Electrical and Electronics Engineers (IEEE) 1284 device (not shown) which are provided in the body of the image forming apparatus.

The HDD 1 stores image data and programs, the CPU 5 controls the operation of the image forming apparatus, and the memory 6 is randomly accessible. The printer engine 20 functions as an imaging unit that forms a visible image on a recording material, and can form an image based on image data transferred from an external device through an IEEE 1284 interface 17, image data transferred from the PHY devices 2 and 3, and image data stored in the HDD 1 and the card 4. By forming a system with the printer engine 20, an image forming apparatus such as a printer, a copying machine, and a facsimile each including the ASIC 10 is realized.

More specifically, the ASIC 10 includes a memory arbiter 30, an HDD interface 11 and a direct memory access (DMA) controller 21 for connecting between the memory arbiter 30 and the HDD 1, and a network interface 12 and a DMA controller 22 for connecting between the memory arbiter 30 and the network device 2. The ASIC 10 also includes a USB interface 13 and a DMA controller 23 for connecting between the memory arbiter 30 and the USB device 3, and an SD card interface 14 and a DMA controller 24 for connecting between the memory arbiter 30 (and a memory controller 16) and the card 4. The ASIC 10 further includes a CPU interface 15 for connecting between the memory arbiter 30 and the CPU 5, the memory controller 16 for connecting between the memory arbiter 30 (and SD card interface 14) and the memory 6, the IEEE 1284 interface 17 for connecting between the memory arbiter 30 and the IEEE 1284 device (not shown), and a printer engine interface 18 for connecting between the memory arbiter 30 and the printer engine 20.

In addition to the applications for the hard disk, the network, or the like, the SD card interface 14 is connected with a data transfer path by the DMA controller 24 through the memory arbiter 30 and with a path to the memory controller 16 for random access. In such a configuration, data transfer can be performed not only from the card 4 to the memory 6 but also between the card 4 and HDD 1 through the HDD interface 11, the network device 2 through the network interface 12, or the USB device 3 through the USB interface 13.

Figure 2:
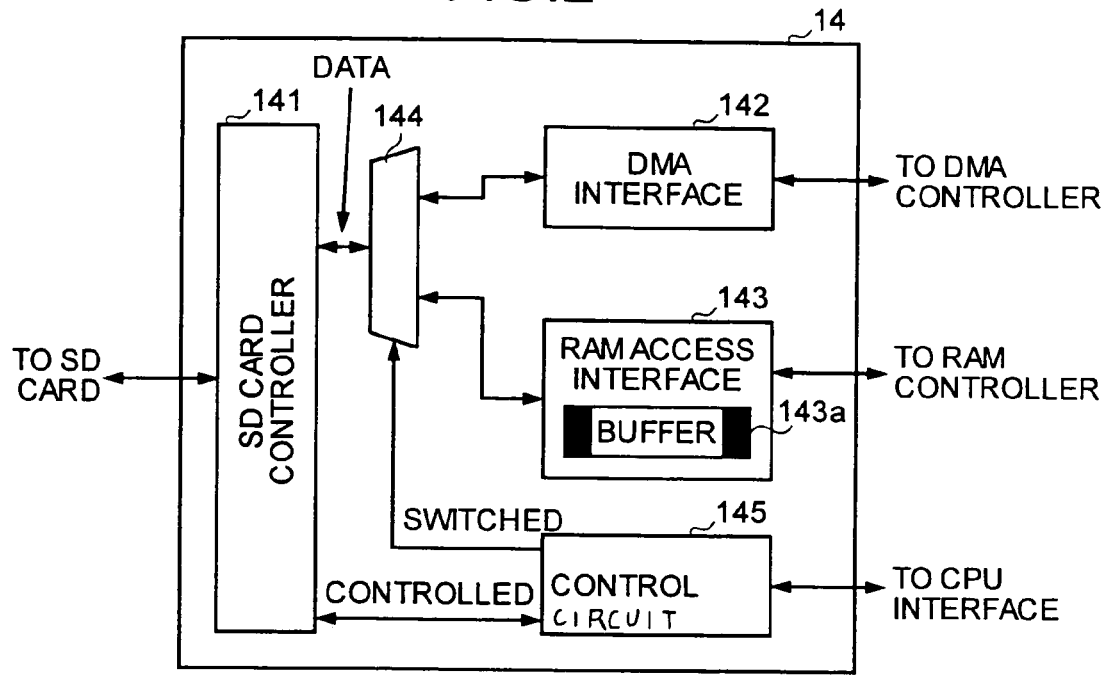
FIG. 2 is a detailed block diagram of an SD card interface used in the image forming apparatus.

FIG. 2 is a detailed block diagram of the SD card interface 14. This SD card interface 14 includes an SD card controller 141 that performs actual data communications with the card 4 according to the specification of the card 4. A control circuit 145 is a circuit block that receives a control command issued from the CPU 5 to the SD card controller 141 or transfers commands from the SD card controller 141 to the CPU 5, and switches to a multiplexer 144 that selects between a DMA interface 142 and a RAM access interface 143 for data transfer to the card 4.

The DMA interface 142 is a circuit block that connects between the SD card controller 141 (and the multiplexer 144) and the DMA controller 24 of FIG. 1, and that provides matching between the DMA interface 142 and the SD card interface 14 to allow data transfer by DMA. The RAM access interface 143 is a circuit block that connects between the memory (RAM) controller 16 or the CPU interface 15 and the SD card controller 141 (and the multiplexer 144), and that provides matching between the RAM access interface 143 and the SD card interface 14.

The RAM access interface 143 includes a buffer (RAM) 143a having a capacity to hold data of a plurality of sectors (512 bytes×N sectors). Data in the buffer 143a is transferred to the card 4. If a read-access is received from the CPU 5 relating to data stored in the buffer 143a, the data is read from the buffer 143a and not from the card 4. Consequently, the access to the card 4 is suppressed to a minimum.

The processing of initialization in the image forming apparatus according to the embodiment is explained below. The card 4 stores a boot program. Generally, the system program such as the boot program is installed in the memory 6 such as read only memory (ROM) and the memory 6 is placed on a board such as a controller board. However, in the present embodiment, the boot program is stored in the card 4 in advance to suppress a unit cost of pits, and this allows reduction of developing costs. Moreover, the system program stored in the card 4 can be updated or edited more easily than those in the ROM. Therefore, upgrading of the image forming apparatus and a change in the program by a correction program can easily be realized.

Figure 3:
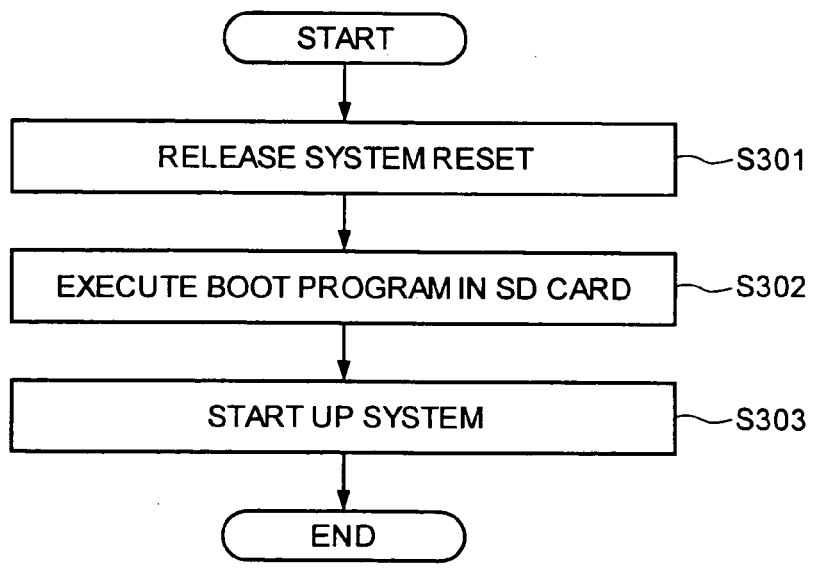
FIG. 3 is a flowchart of procedures for initialization of the image forming apparatus.

FIG. 3 is a flowchart of the procedures for initialization of the image forming apparatus. The initialization is performed when power of the image forming apparatus is turned on. In the image forming apparatus, the CPU 5 releases the system reset (step S301). After the startup of the CPU 5, the boot program stored in the card 4 is read and executed (step S302). More specifically, the boot program stored in the card 4 is copied to the RAM. Then, the boot program copied to the RAM is executed (step S303).

The boot program is generally stored in the card 4, but all the system program including the boot program may be stored in a rewritable nonvolatile memory such as a flash memory on a controller board, and a new-version system program is store in the card 4 to update the system program in the nonvolatile memory by the system program stored in the card 4.

Figure 4:
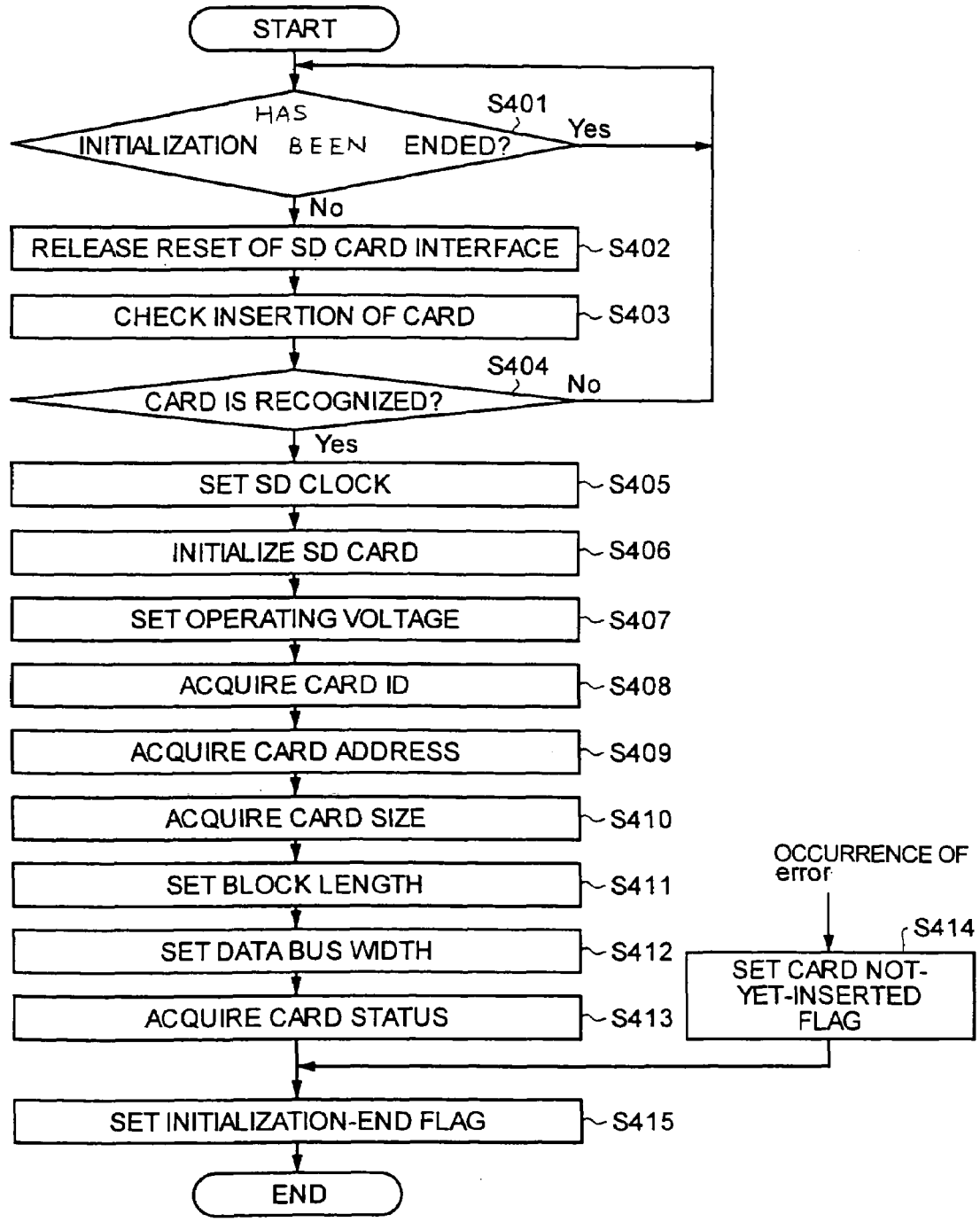
FIG. 4 is a flowchart of procedures for initialization of the SD card.

FIG. 4 is a flowchart of procedures for initialization of the card 4 by the SD card interface 14. As the initialization is sequentially operated, it is not difficult to operate unless the procedures are executed in the wrong order. However, the problem is occurrence of an error due to cases like the card not being inserted into the image forming apparatus or a card being inserted that is not allowed. If the card is not inserted, its insertion can be continuously confirmed during a predetermined period.

Occurrence of an error may be suppressed by restricting the purpose of using the initialization for the hardware in the SD card interface 14. In other words, the purpose is restricted to some specific work by a service engineer such as update of software and execution of a self-diagnostic program.

The procedures for the initialization of the SD card by the SD card interface are explained with reference to FIG. 4. At first, it is determined whether the card 4 has been initialized (step S401). If the card 4 has not been initialized, reset of SD card interface is released (step S402). It is checked whether the card 4 has been inserted (steps S403, S404), and if the card 4 has been inserted and it is recognized, the process proceeds to step S405. On the other hand, if the card 4 cannot be recognized, the process returns to step S401.

In the processing at step S405 and thereafter, an SD clock is set (step S406), the card 4 is initialized (step S406), an operating voltage is set (step S407), a card identification number (ID) is acquired (step S408), a card address is acquired (step S409), a card size is acquired (step S410), a block length is set (step S411), a data bus width is set (step S412), a card status is acquired (step S413), an initialization-end flag indicating that the card has been initialized is set (step S415). If an error occurs, a card not-yet-inserted flag indicating that the card has not yet been inserted is set (step S414), and the process proceeds to step S415.

Figure 5:
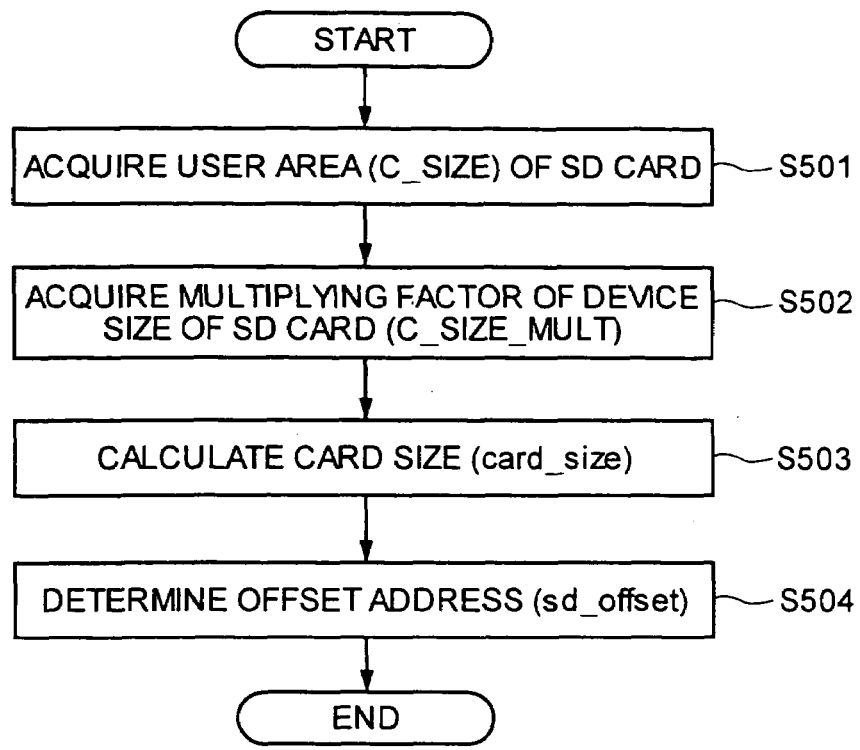
FIG. 5 is a flowchart of procedures for acquiring a card size.
Figure 6:
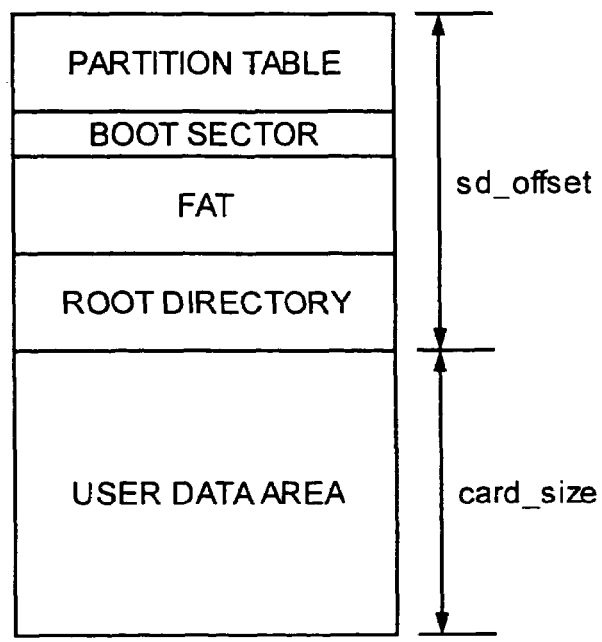
FIG. 6 is an example of a memory map of the SD card.

FIG. 5 is a flowchart of procedures for acquiring the card size. FIG. 6 is an example of a memory map of the SD card. The memory map includes a partition table, a boot sector, a file allocation table (FAT), a root directory, and a user data area. The processing for acquiring the card size at step S410 requires an offset address of a user area according to a storage capacity of the SD card.

In the processing for acquiring the card size, at first, a user area size (C_SIZE) of the SD card is acquired (step S501). A multiplying factor of a device size of the SD card (C_SIZE_MULT) is acquired (step S502). A card size (card_size) is calculated by the following equation (step S503):

$$\text{card size} = \text{C\_SIZE}/[2^{2(9-\text{C\_SIZE\_MULT})}].$$

An offset address (sd_offset) according to the card size (card_size) is determined (step S504).

The area size of the user data is obtained by performing acquisition of the card size in the above manner. A nominal size of the card 4 is obtained from the user area size to obtain the offset address (sd_offset). Only the user area is open to the CPU 5 in areas of the SD card. Therefore, an address as a target to be read out is obtained by adding the offset address (sd_offset) to an address (segment address: rd-adr) accessed by the CPU 5. For access to the card 4, a sector number (sector_num) to be read out is obtained by the following equation assuming one sector holds, for example, 512 bytes:

sector_num=(rd_adr+sd_offset)>>9.

Figure 7:
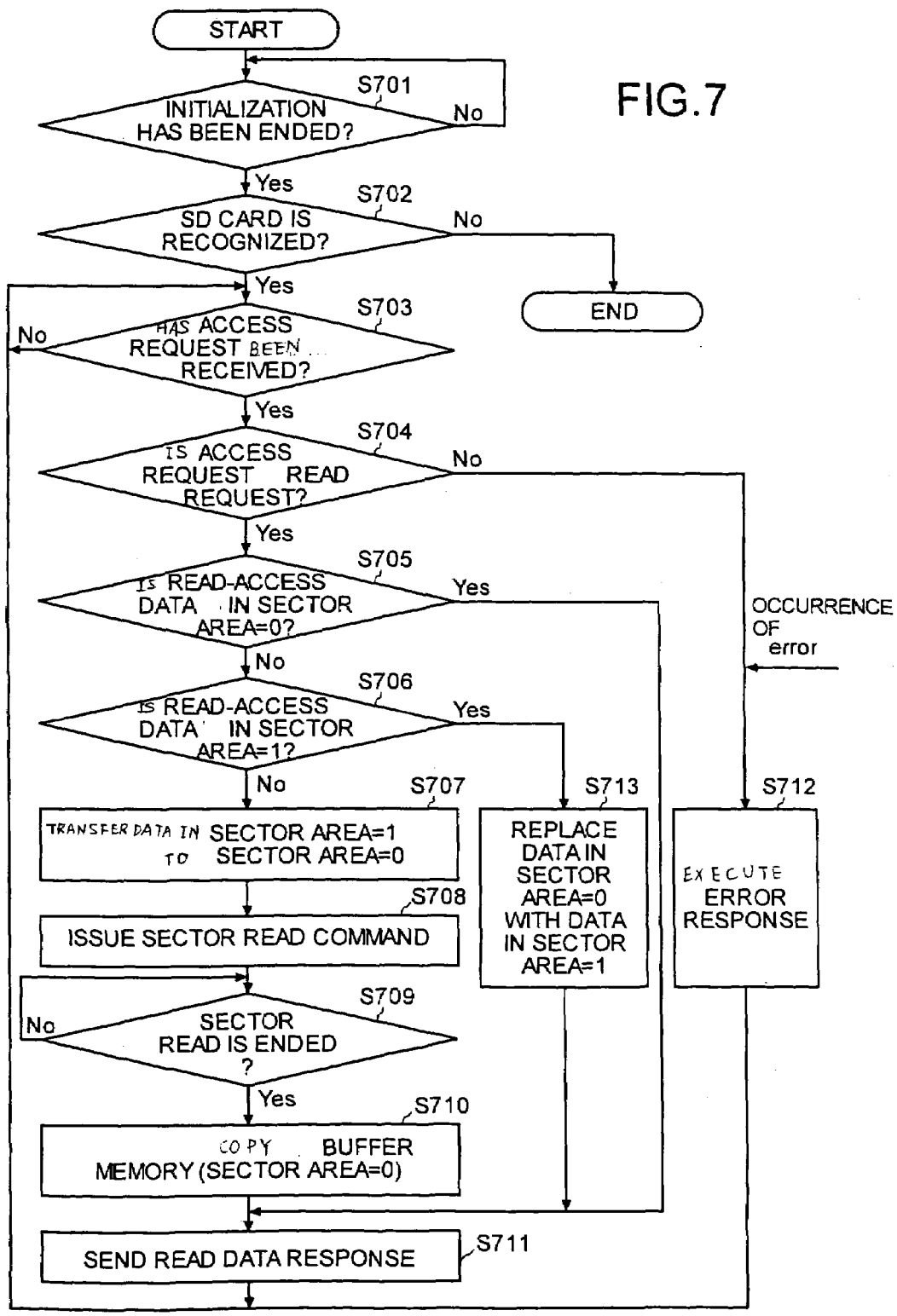
FIG. 7 is a flowchart of processing for a read-access from a CPU.

FIG. 7 is a flowchart of processing when a read-access to the card 4 is made from the CPU 5. This flowchart is based on a case where the card 4 has the buffer 143*a* holding two sectors. This circuit is also performed by sequential processing. This circuit is not started before the initialization of FIG. 3 is ended. If the card 4 is not recognized when the initialization is ended, then the sequencer is stopped. This operation is one of the restrictions of purpose as explained above, and therefore, it does not cause any trouble. As shown in FIG. 7, only the read-access to the SD card is described. Therefore, if an access request from the CPU 5 is any request other than the read-access, an access error is returned to the CPU 5.

If a data amount of the read request from the CPU 5 is within a sector on the card 4 that corresponds to either one of the two sectors held in the buffer 143*a*, it is determined that the buffer 143*a* already has data. In this case, the requested data is returned immediately from the buffer 143*a* to the CPU 5. At this time, the accessed sector area is defined as "area=0", and the sectors are managed so that the sector as area=0 is always the last accessed sector.

If the requested data is out of the range of the sectors stored in the buffer 143*a*, the sequencer abandons the sector data in sector area (area)=1, and transfers the sector data in area=0 to area=1 (transfer may be performed by bank switching). Corresponding sector data is read out from the card 4, and the read-out sector data is stored in area=0. The data for the address requested from the CPU 5 is returned thereto. Through the operation, the CPU 5 can read out data for an arbitrary address in the card 4 without recognizing the card 4.

FIG. 7 is the flowchart of procedures for a read-access from the CPU by the SD card interface. At first, it is determined whether the initialization of FIG. 1 has been ended (step S701). If the initialization has been ended, it is determined whether the card 4 is recognized (step S702). If it is determined that no card 4 is recognized, the processing is ended. On the other hand, if the card 4 is recognized, it is determined whether an access request to the card 4 has been received (step S703). If the access request has not been received, the process returns to step S703. On the other hand, if the access request has been received, it is determined whether the access request is a read request (step S704).

If the access request is the read request to the card 4, the process proceeds to step S705, while if it is not the read request, the error response is executed (step S712), and the process returns to step S703.

At step S705, it is determined whether the read-access data is in the sector area=0. If it is not in the sector area=0, the process proceeds to step S706, while if it is in the sector area=0, the process proceeds to step S711 where the read-access data is read from the sector area=0 and the read data is sent to the CPU 5.

At step S706, it is determined whether the read-access data is in the sector area=1. If it is not in the sector area=1, the process proceeds to step S707, while if it is in the sector area=1, the data in the sector area=0 is replaced with the data in the sector area=1 (step S713), and the process proceeds to step S711 where the read-access data is read from the sector area=0 and the read data is sent to the CPU 5.

At step S707, the data in the sector area=0 is transferred to the sector area=1, and a sector read command is issued to the card 4 (step S708). The process waits until the sector read is ended (step S709). At step S709, the sector read is ended, and the sector data is copied to the sector area=0 (step S710). Then, the read-access data in the sector area=0 is read, the read data is sent to the CPU 5 (step S711), and the process returned to step S703.

Thus, even if the access from the CPU 5 is made across the sectors of the card 4, the data is maintained for a predetermined period, which allows reduction of overhead for data read to execute a program over the boundary between sectors and to execute a small size sub-function. Accordingly, the execution speed of the programs can be improved.

It has been mentioned above that the buffer includes an area for two sectors, but the buffer may include an area for three or more sectors.

According to the present invention, it is possible to improve the execution speed of the programs.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An interface circuit capable of allowing transmission of data from a detachable card-type memory, which requires access by sectors, to an electronic device, said interface circuit comprising:

a reading unit that reads document image data for the electronic device including at least one of a printer, a copying machine, and a facsimile from a plurality of sectors within the card-type memory;

a buffer in the reading unit that stores the image data read and has a capacity to store data for the plurality of sectors;

a receiver that receives from the electronic device a read-access control command for the image data stored in the buffer;

a data checker that decides whether the image data corresponding to the read-access control command exists among the data stored in the buffer; and a transmitter that transmits the image data from the buffer to the electronic device when the data checker decides that data corresponding to the read-access control command exists among the data stored in the buffer.

2. The interface circuit according to claim 1, further comprising a data deleter that deletes data in the buffer, wherein if the data checker decides that data corresponding to the read-access control command does not exist among the data stored in the buffer, the data deleter deletes from the buffer data that was sent by the transmitter to the electronic device at an oldest period, the reading unit reads from the card-type memory data corresponding to the read-access control command and stores the data read into the buffer, and the transmitter transmits to the electronic device data corresponding to the read-access control command from among the data stored in the buffer.

3. The interface circuit according to claim 1, wherein the card-type memory is a secure digital card.

4. The interface circuit according to claim 1, wherein the buffer has a capacity to store data for at least two sectors.

5. An application specific integrated circuit having at least one application function from among an image processing function, an image input/output function, and a data communication function, the application functions sharing at least one of a memory and a hard disk as common resources, the application specific integrated circuit comprising:

an interface circuit capable of allowing transmission of data from a detachable card-type memory, which requires access by sectors, to an electronic device, the interface circuit including a reading unit that reads image data for the electronic device including at least one of a printer, a copying machine, and a facsimile from a plurality of sectors within the card-type memory;

a buffer in the reading unit that stores the image data read and has a capacity to store data for the plurality of sectors;

a receiver that receives from the electronic device a read-access control command for data stored in the buffer;

a data checker that decides whether the image data corresponding to the read-access control command exists among the data stored in the buffer; and a transmitter that transmits the image data from the buffer to the electronic device when the data checker decides that data corresponding to the read-access control command exists among the data stored in the buffer.

6. The application specific integrated circuit according to claim 5, wherein the interface circuit further includes a data deleter that deletes data in the buffer, and if the data checker decides that data corresponding to the read-access control command does not exist among the data stored in the buffer, the data deleter deletes from the buffer data that was sent by the transmitter to the electronic device at an oldest period, the reading unit reads from the card-type memory data corresponding to the read-access control command and stores the data read into the buffer, and the transmitter transmits to the electronic device data corresponding to the read-access control command from among the data stored in the buffer.

7. The application specific integrated circuit according to claim 5, wherein the card-type memory is a secure digital card.

8. The application specific integrated circuit according to claim 5, wherein the buffer has a capacity to store data for at least two sectors.

9. An image forming apparatus having at least one application function among an image processing function, an image input/output function, and a data communication function, the image forming apparatus comprising:

an application specific integrated circuit in which the application functions can share at least one of a memory and a hard disk as common resources, the application specific integrated circuit including an interface circuit capable of allowing transmission of data from a detachable card-type memory, which requires access by sectors, to an electronic device, the interface circuit including a reading unit that reads image data for the electronic device including at least one of a printer, a copying machine, and a facsimile from a plurality of sectors within the card-type memory;

a buffer in the reading unit that stores the image data read and has a capacity to store data for the plurality of sectors;

a receiver that receives from the electronic device a read-access control command for data stored in the buffer;

a data checker that decides whether the image data corresponding to the read-access control command exists among the data stored in the buffer; and a transmitter that transmits the image data from the buffer to the electronic device when the data checker decides that data corresponding to the read-access control command exists among the data stored in the buffer.

10. The image forming apparatus according to claim 9, wherein the interface circuit further includes a data deleter that deletes data in the buffer, and if the data checker decides that data corresponding to the read-access control command does not exist among the data stored in the buffer, the data deleter deletes from the buffer data that was sent by the transmitter to the electronic device at an oldest period, the reading unit reads from the card-type memory data corresponding to the read-access control command and stores the data read into the buffer, and the transmitter transmits to the electronic device data corresponding to the read-access control command from among the data stored in the buffer.

11. The image forming apparatus according to claim 9, wherein the card-type memory is a secure digital card.

12. The image forming apparatus according to claim 9, wherein the buffer has a capacity to store data for at least two sectors.

13. The image forming apparatus according to claim 9, wherein a program stored in the card-type memory is directly executed.

14. An interface circuit capable of allowing transmission of data from a card-type memory, which requires access by sectors, to an electronic device, said interface circuit comprising:

a reading unit configured to read data for the electronic device from a plurality of sectors within the card-type memory;

a buffer in the reading unit configured to store data read by the reading unit and store the data in a dedicated sector area of the buffer;

a receiver configured to receive from the electronic device a read-access control command for the data stored in the buffer;

a data checker configured to determine whether data corresponding to the read-access control command exists in the dedicated sector area of the buffer; and a transmitter configured to transmit the data from the dedicated sector area of the buffer to the electronic device when the data checker determines that data corresponding to the read-access control command exists in the dedicated sector area of the buffer.

* * * * *